A. N. BENN.
COMBINATION SMOKING TROLLEY.
APPLICATION FILED MAR. 30, 1917.
1,284,855.
Patented Nov. 12, 1918.
7 SHEETS—SHEET 1.
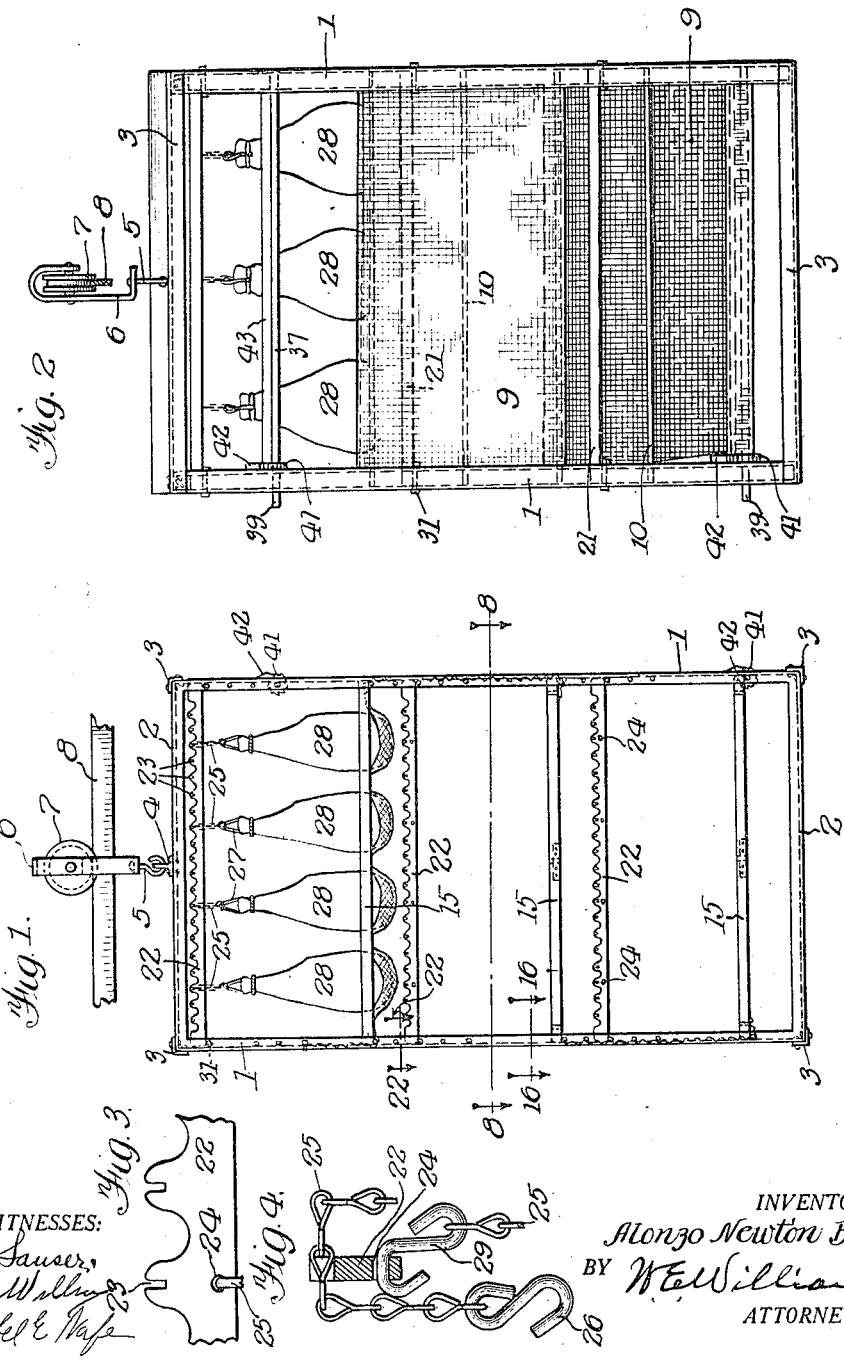
WITNESSES:
INVENTOR.
Alonzo Newton Benn,
BY W. E. Williams
ATTORNEY

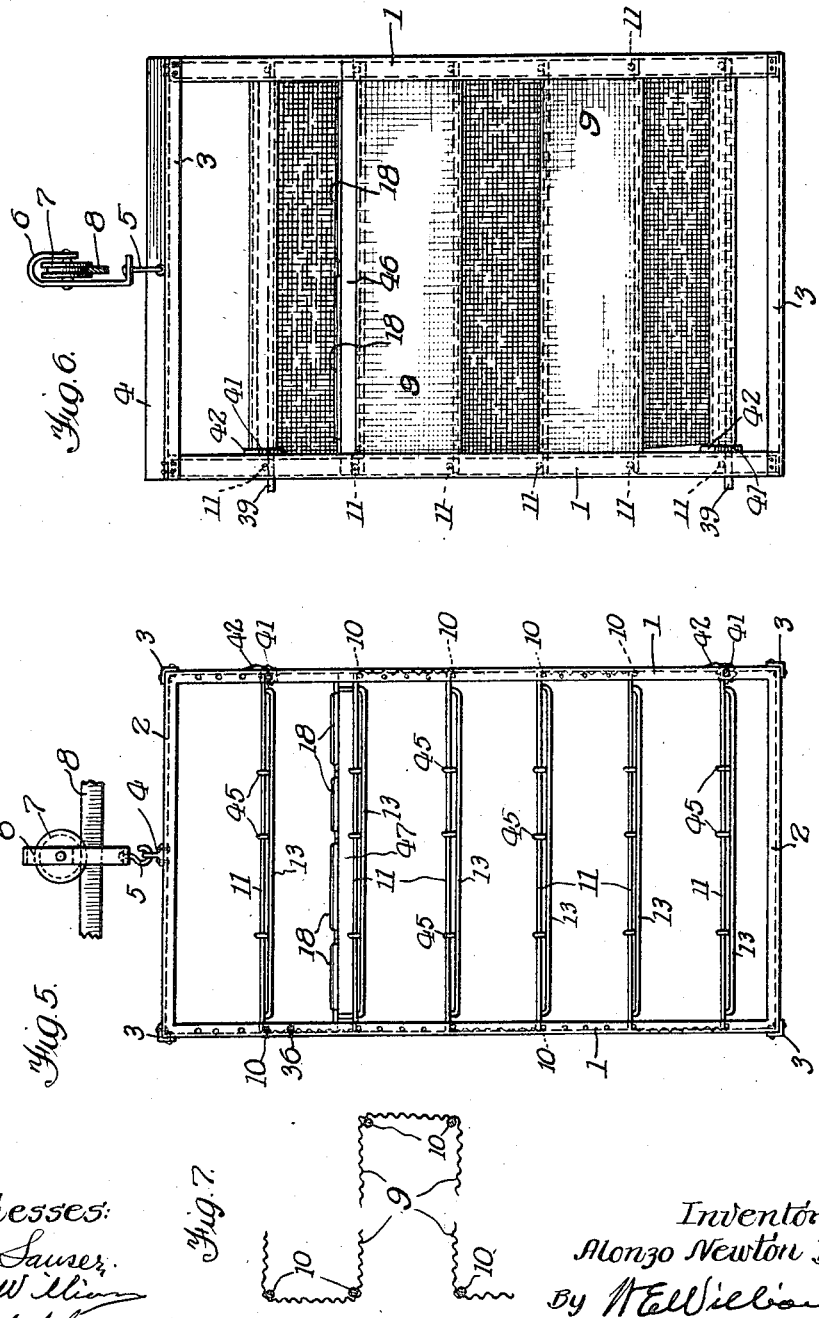

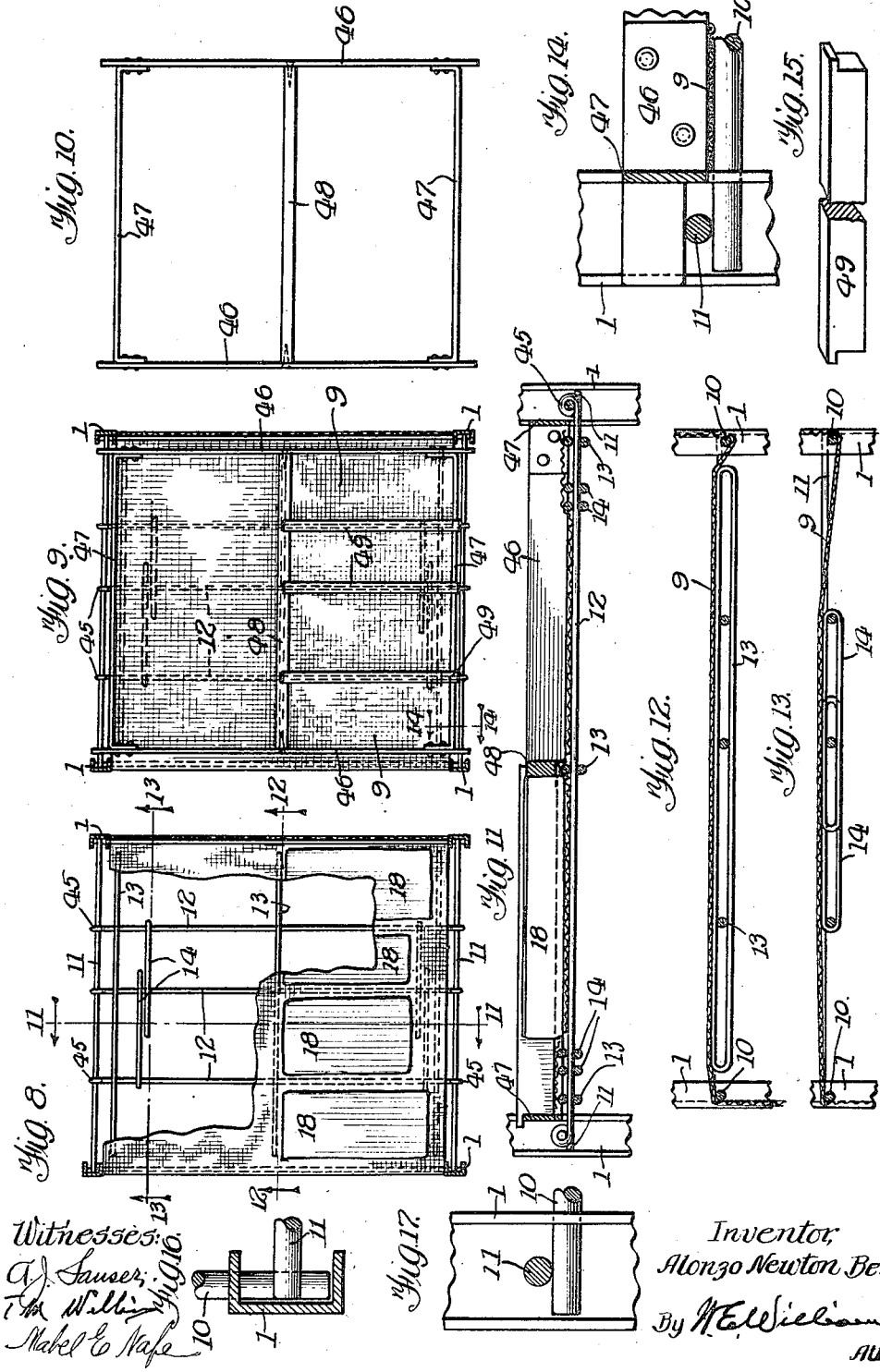

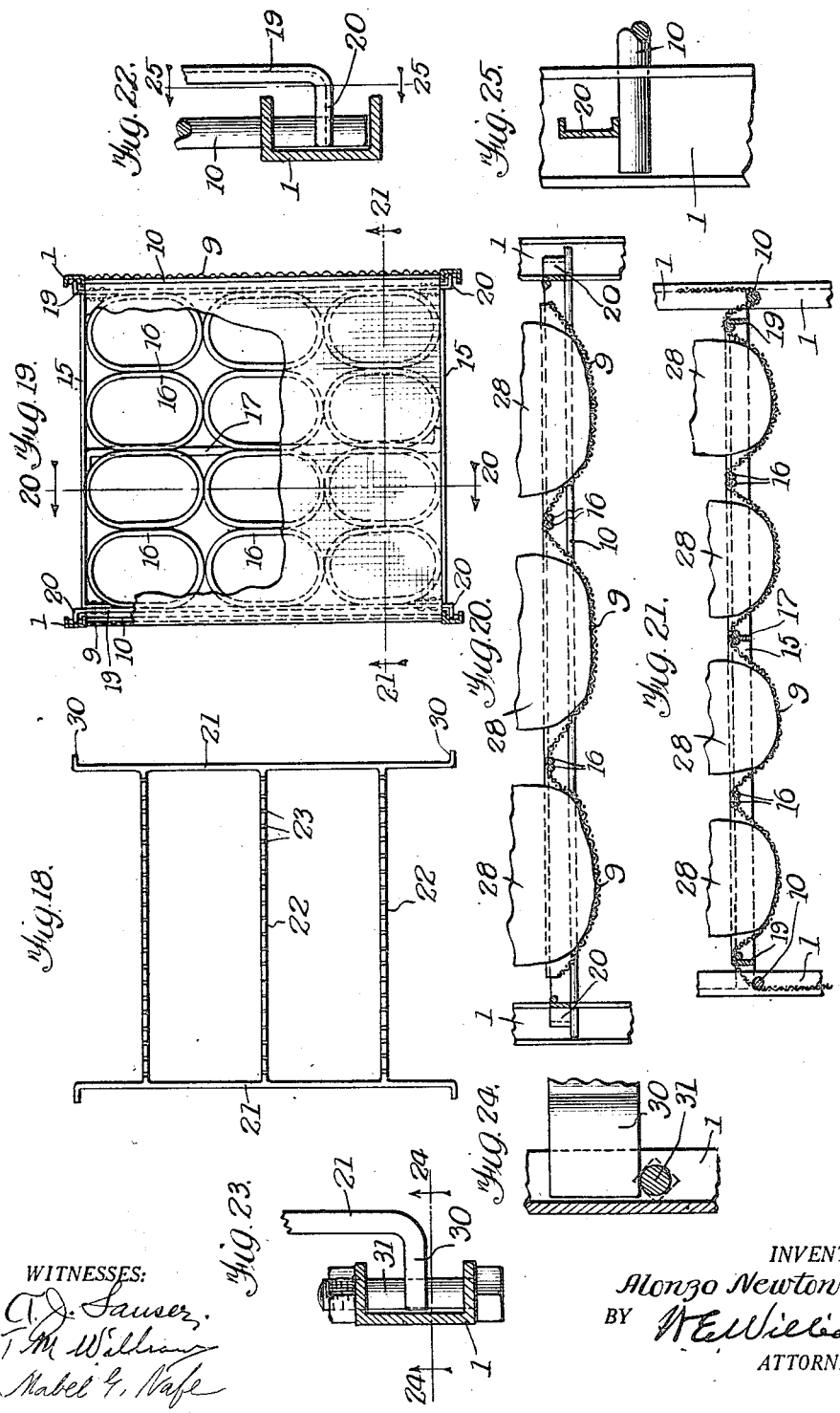

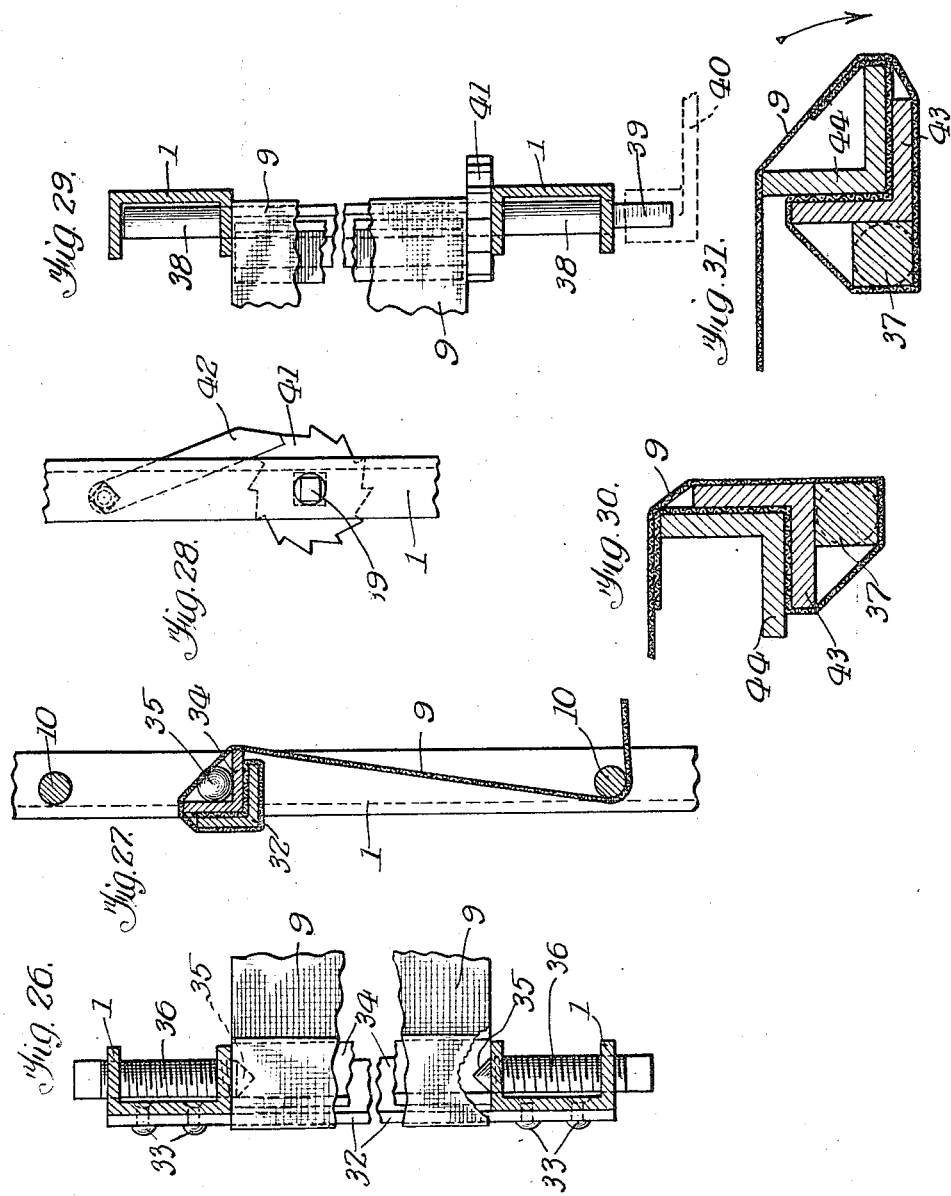

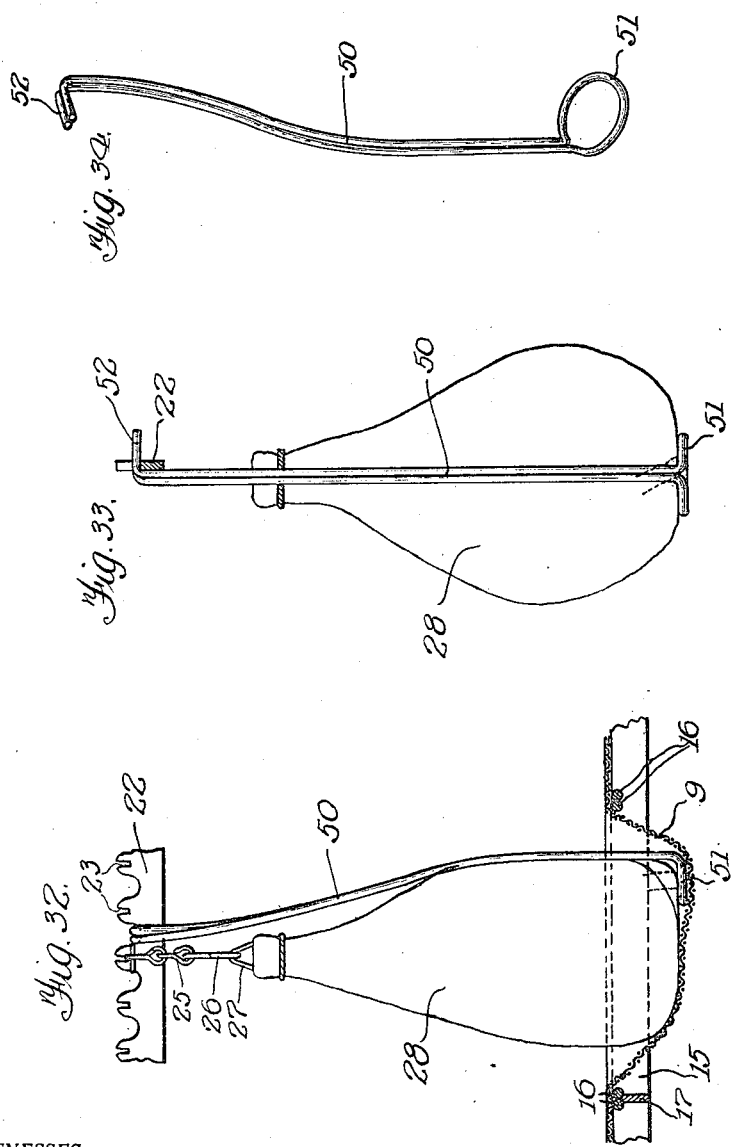

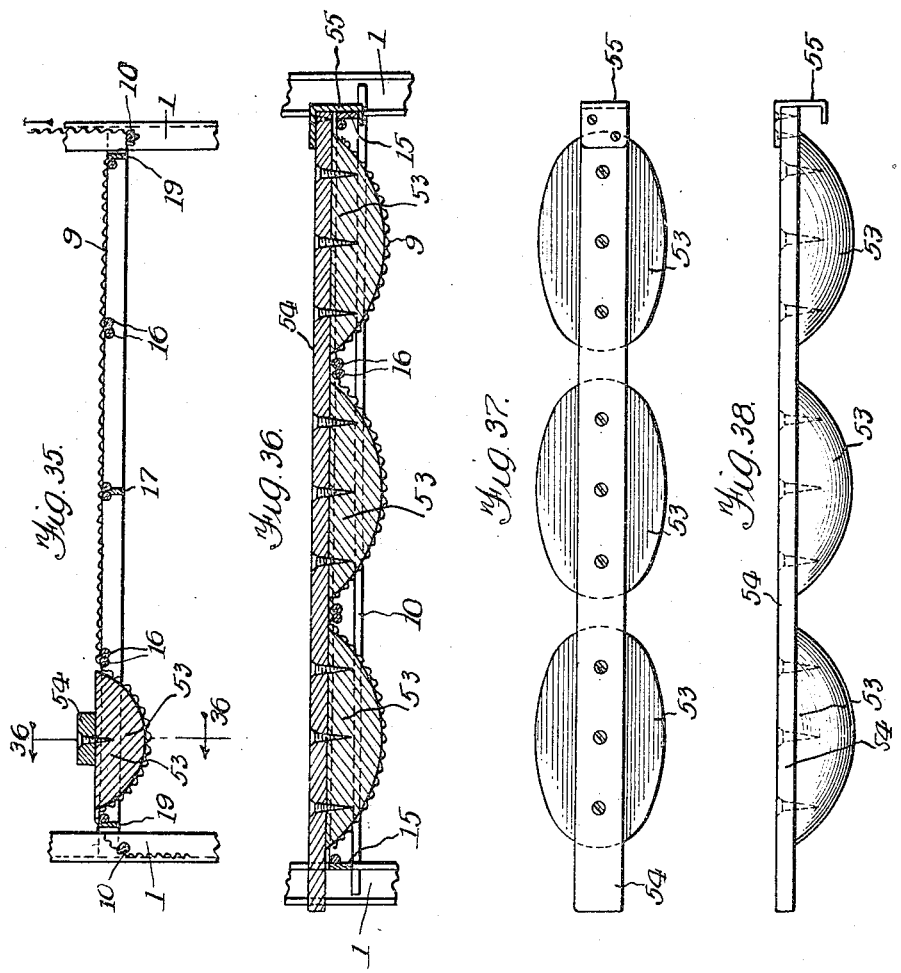

UNITED STATES PATENT OFFICE.

ALONZO NEWTON BENN, OF CHICAGO, ILLINOIS.

COMBINATION SMOKING-TROLLEY.

1,284,855.     Specification of Letters Patent.     Patented Nov. 12, 1918.

Application filed March 30, 1917. Serial No. 158,621.

*To all whom it may concern:*

Be it known that I, ALONZO NEWTON BENN, a citizen of the United States, residing at Chicago, in the county of Cook and State of Illinois, have invented a new and useful Improvement in Combination Smoking-Trolleys, of which the following is a specification.

My invention relates to that class of appliances used in carrying and supporting meats into and out of the smoking chambers as commonly employed in modern packing houses. These devices for convenience of handling and moving about are usually supported from over-head rails and moved about by means of little trolleys running on these rails and therefore these devices are known more or less generally as trolleys. However in so far as the details of supporting the meats themselves are concerned it is immaterial as to whether the rig is movable or as to how it is supported either from the top, bottom or sides as may suit the convenience in any particular case.

It is desirable to have as little of this class of apparatus as is possible and at the same time be able to handle the range of meats that necessarily must be handled in a packing house. Further simplicity in construction and arrangement of the parts is essential since this work is ordinarily performed by labor more or less unskilled.

The object of my invention is to simplify and improve some more or less important parts from what others and myself have heretofore produced in apparatus in this line and the invention is set forth in the claims.

The chief classes of meats handled by devices of this kind are hams and bacon and a rig that is adapted to those meats will also handle as a usual thing anything else that needs to be carried by a smoking trolley so that in this case I will particularly point out the special features that relate to hams and bacon and those skilled in the art will need no other special instructions in order to use the apparatus for any other class of meats desired or usually handled in this way.

The apparatus shown in the drawings is composed essentially of a general out-lying supporting frame-work into which are fitted detail parts which are adapted for the varying purposes required for handling either hams or bacon and at the same time secure the detailed merits that will be pointed out.

Reference will be had to the accompanying drawings in which:

Figure 1 is a side elevation and Fig. 2 an end elevation looking at the right of Fig. 1 at a time when a part of the trolley is loaded with hams.

Figs. 3 and 4 are details used in connection with the ham hanging devices.

Fig. 5 is a side and Fig. 6 is an end elevation of the trolley when rigged up for bacon purposes.

Fig. 7 is a diagrammatical view showing the way the cloth is trained through the apparatus.

Fig. 8 is a plan of a shelf on line 8—8 of Fig. 1 showing some bacon in place and with parts broken away for clearness of illustration.

Fig. 9 is the same view as that of Fig. 8 when prepared to receive bacon but before any bacon is placed thereon.

Fig. 10 is a plan of a frame that is used for shaping the bacon as it is placed on the shelves shown in Figs. 8 and 9.

Fig. 11 is an enlarged sectional detail elevation on line 11—11 of Fig. 8.

Fig. 12 is a sectional elevation transversely to that of Fig. 11 on line 12—12 of Fig. 8.

Fig. 13 is a similar view to that of Fig. 12 but on line 13—13 of Fig. 8.

Fig. 14 is a sectional detail on line 14—14 of Fig. 9.

Fig. 15 is a perspective view of one of the movable blocks used in connection with the frame shown in Fig. 10.

Fig. 16 is a plan section of one of the corner posts approximately on line 16—16 of Fig. 1.

Fig. 17 is a vertical elevation of the parts shown in Fig. 16 looking from the right of Fig. 16.

Fig. 18 is a plan of the frame to which the hams are hung when the trolley is used for hams.

Fig. 19 is a plan of a shelf with parts broken away used for supporting the butts of the hams.

Fig. 20 is a transverse sectional view on line 20—20 of the shelf shown in Fig. 19 but on an enlarged scale.

Fig. 21 is a sectional elevation on line 21—21 of Fig. 19 and of a corresponding scale to that of Fig. 20.

Fig. 22 is a plan sectional detail of one of the corner posts on line 22—22 of Fig. 1.

Fig. 23 is a view corresponding to that of Fig. 22 but near the top of the frame of the trolley.

Fig. 24 is a sectional elevation on line 24—24 of Fig. 23.

Fig. 25 is a sectional elevation on line 25—25 of Fig. 22.

Figs. 26, 27, 28, 29, 30 and 31 are details in relation to the mechanism used to secure and tighten the cloth part of the shelves in the apparatus and will be described later.

Figs. 32, 33 and 34 indicate a device used in hanging the hams in the trolley.

Figs. 35, 36, 37 and 38 relate to a device used in forming the cloth sheeting in shape to receive the ham butts on the shelves.

I prefer to form my trolley with an outlying frame-work having vertical corner posts 1 made of channel sections and at the ends I carry this channel section across as indicated by 2, thus making as it were the end frames of the apparatus a channel frame. I connect the channel end frames at the four corners by means of angles 3 indicated in Figs. 1, 2, 5 and 6 and at the top across the middle of the trolley I use a T-section 4 which forms the bail as it were from which the whole rig is supported. To the T piece 4 I connect the hook 5 which is connected to the frame 6 of the trolley wheel 7 which runs on the over-head rail 8 in the well known manner of trolley devices used in packing houses.

The frame-work composed of the channels 1 and 2, angles 3 and T 4 section comprises a cage as it were into which I mount a series of shelves and hanging devices for carrying the meats as desired.

The sheeting of my shelves is composed of cloth indicated by 9 which is trained over a series of rollers indicated by 10 in the diagrammatical form indicated by Fig. 7. This cloth 9 is supported from beneath over the shelf area by a skeleton framework of rods indicated by 11, 12, 13 and 14 in Fig. 8 in the case of bacon shelves and by a skeleton frame-work indicated by 15, 16, 17, 19 and 20 in Fig. 19 used in connection with hams.

In case of the bacon shelves the rods 11, 12, 13 and 14 are adjustable in relation to each other for the purpose of forming small frames to fit approximately each piece of bacon placed on the shelves as is indicated by Fig. 8 where 18 indicates the bacon pieces.

The skeleton frame-work for the ham butts is substantially a series of oval or curved rings 16 united to each other by welding or other suitable means and correspondingly united to bars 15 which are connected at their ends to channel bars 19, the ends of which are turned as indicated by 20 and are supported by the rollers 10. A central supporting member 17 for the oval or curved rings extends across between the bars 15 and is connected thereto.

The oval or curved rings 16 are shaped in relation to the butts of the hams so that the cloth 9 which is trained over the skeleton frame-work may be drawn by the weight of the hams into small pockets or hammocks suited to shape the butts of the hams as desired.

The arrangement of the bacon shelves with the skeleton frame-work of rods 11 to 14 inclusive may also be used for hams by adjusting the rods in relation to each other to form the small hammocks for the ham butts in like manner as is indicated in Figs. 19, 20 and 21 but not so successfully as with the oval or curved ring construction of Fig. 19.

For the purpose of adapting the trolley to be used for hams I provide the frame-work shown in Fig. 18 having the members 21 connected to each other by the members 22, the latter being provided with notches 23 and holes 24 adapted to engage the chain links 25 and the hooks 26 which connect to the cords 27 attached to the shanks of the hams 28. On the upper ends of the chains 25 I provide hooks 29 which are engaged in the holes 24 before mentioned as a permanent engagement for these chain hangers with the members 22, see Fig. 3. End projections 30 of the members 21, see Fig. 18, are supported in the frame-work channel posts 1 by bolts 31 as indicated in Figs. 23 and 24.

The cloth 9 is secured at its ends in the frame-work as is indicated by Figs. 26 to 31 inclusive, wherein I provide a fixed fastening for one end of the cloth shown by Figs. 26 and 27 and a windlass adjustable fastening for the other end of the cloth as indicated by Figs. 28, 29, 30 and 31.

In using the apparatus for bacon purposes alone it is desirable that both ends of the cloth be secured by the windlass adjustable fastenings since the cloth is necesarily drawn tighter than in the case of the hams.

The fixed fastening of Figs. 26 and 27 is composed of a rigid angle bar 32 which has its lower flange lopped off at the ends only to permit the vertical flange to be riveted as indicated by 33 to the vertical channel posts 1 of the frame-work. A loose angle piece 34 is made to clamp the cloth between it and the angle 32 by means of the pointed ends 35 of screw studs 36 threaded through holes in the flanges of the channel posts 1. In securing the cloth when the same is first trained in the apparatus, the end of the cloth is made to enwrap the angle 32 as shown in section in Fig. 27 and then the angle 34 is put in place and clamped as described by means of the screws 36 and then the body of the cloth is trained over the flanges of the angle 34 and down to the adjacent roller 10 as indicated. A less efficient but still a serviceable arrangement may be had by omitting the screws 36 and angle bar 34 and substituting therefor a block of wood having a square sectional out-line and relying on the pressure of the cloth producing such friction on its own end through the medium of the wooden block as to hold the cloth in place.

The windlass or adjustable fastening for the end of the cloth is composed of a square rod or bar 37 having rounded ends 38 journaled in holes in flanges of the channel posts 1, see Fig. 29, one end of the bar 37 being squared for the application of a wrench as indicated by 39, the wrench being indicated by dotted lines 40. Upon this bar 37 there is fixed a ratchet 41 under control of a pawl 42 as indicated in Fig. 28. The clamping means for the cloth at this windlass is made by an angle bar 43 fixed to the bar 37 in connection with which there is the loose angle bar 44 so placed as to act as a clamping block to clamp the end of the cloth between itself and the angle bar 43 by the pressure of the cloth itself as the windlass is wound up taking in the cloth from the position of 30 to that of 31 whereby the pressure of the cloth acts as its own binding means in securing its end to the windlass. While I have shown this windlass member composed of the bar 37 and the angle bar 43 as separate pieces and secured together, it may be made in the desired form out of a single casting.

In using the apparatus for bacon I may adjust the skeleton frame work of the bacon shelves to make substantially small frames approximately the sizes of the pieces of bacon to be carried as indicated by Fig. 8. To permit the adjustment above indicated I connect the rods 12 to the rods 11 by means of the loose eyes 45 and I make the rods 13 and 14 in link form as shown in Figs. 12 and 13 in a manner to slide loosely along the rods 12. Thus by adjusting these rods in relation to each other I make small frames slightly larger than the pieces of bacon, which frames support the cloth from beneath and allow the bacon pieces to rest as it were on what may be termed a small cloth screen for each piece.

I may if I choose make this skeleton for the bacon a rigid grid in sections large enough for the largest pieces of bacon, in which case the smaller pieces of bacon would be more widely separated from each other than in the case when the adjustable frame-work is used but with the rigid grid and small pieces of bacon I am not able to get as nice a shape to the finished pieces of bacon as with the adjustable frame-work.

In placing the bacon on my shelves I shape it up in positions of repose to cause it to assume a set during the smoking into forms most desirable for the marketable product and to assist in so shaping the pieces of bacon when placing them on the shelves I use the frame-work shown in Fig. 10 together with the loose blocks shown in Fig. 15. The frame-work of Fig. 10 is composed of members 46 connected at their ends by the members 47 and connected across the middle by the member 48 and between this member 48 and the ends 47 I place the blocks 49 as indicated in Fig. 9 to correspond with the widths of the several pieces of bacon 18 over the rods 12 of the skeleton-frame-work. The straight edges of the member 48 and the blocks 49 aline the sides of the bacon pieces in regular out-line and they so remain after the blocks and frame-work of Fig. 10 are removed. During the smoking and drying that takes place with the bacon pieces they take on a permanent set in desirable merchantable forms which they retain after removal from the shelves.

To assist in hanging the hams in my trolley in a manner that the butts of all the hams regardless of their size may be located about the same relation to the cloth sheeting of the shelves, I provide a placing hook indicated by 50 in Figs. 32, 33 and 34.

The hook 50 is provided with the loop 51 adapted to register over the bone in the ham butt as indicated in Figs. 32 and 33. This placement of the hook will have an average relation in relation to the fleshy parts of all the ham butts regardless of the total length of the hams. At the other end of the hook 50 I provide the bracket end 52 adapted to be engaged over the bars 22 of the ham hanging frames.

In using the hook 50 in placing the hams I first hang the hams to the bars 22 by means of the hook and while the hams are so held I secure their shanks by the chains 25 and register the chains taut in the notches 23 of the bars 22 and then remove the hook 50 and thus the butts of the hams are all registered in approximately the same relation to the cloth sheeting of the shelves which when drawn taut will bear evenly on the butts of all the hams.

I may when desired shape the cloth sheeting for the ham butts on the shelves in the form of the hammocks or pockets required by the use of some shaping blocks adapted to depress the cloth to the shape desired. Such shaping blocks are shown in Figs. 35, 36, 37, and 38, and are indicated by 53 and connected to a bar 54 on the end of which there is the registering clip 55, the latter adapted to bear against the bars 15 on the shelves and register the blocks 53 as desired in the openings of the skeleton frame-work of the shelves.

With the shaping blocks I shape three pockets at a time in the shelf and move it along consecutively and thus shape the cloth throughout the shelf.

In Fig. 35 one of the blocks 53 is shown in transverse section and in Fig. 36 the series of three blocks are shown in longitudinal section.

By shaping the cloth into pockets or small hammocks as indicated with the blocks as described I secure a more even bearing of the ham butts on the cloth with less trouble than with other means.

Meats that have been smoked heretofore by the methods commonly used in the case of hams shrink unevenly at the butts, crack and burn more or less in the different portions of the fleshy parts as relates to the lean and fat tissues, always leaving small protrusions or portions more or less injured during the smoking and drying process. The same is true as relates to the fleshy portions of the bacon and in the case of bacon there are additional injuries inflicted upon the several pieces because of impressions made in the meat by the hanging or supporting devices heretofore used. With my trolley and my hanging and supporting devices I avoid that class of injuries to the meat and secure much more desirable shapes for the finished pieces of meat.

I prefer to use a thin cotton cloth for the sheeting for my shelves but a fine mesh fabric of other material may suffice.

My cloth sheeting allows all the ventilation that is necessary for the efficient smoking and drying and at the same time protects the meat from excess burning, and smoking and it saves shrinking, cracking and injurious distortions of the meat pieces.

With my apparatus I am enabled to shape and mold the pieces of meat when they are in a soft and pliable state into forms more desirable for the finished product than have ever heretofore been accomplished in so far as I am informed.

The adjustable skeleton shelves which I now use for the bacon shelves arranged as described may be quickly removed or replaced and adjusted to the desired form easily and quickly, which is due in part to the use of the link shaped rods which I use as part of the members of said frame-work.

What I claim is:

1. In a smoking trolley, a main supporting frame-work, a series of skeleton frame-work shelves having curved shaped apertures approximating the out-line of the meat ends; with a cloth sheeting covering the skeleton frame shelves and depressed into the apertures by the weight of the meat pieces supported thereon.

2. In a smoking trolley, a general supporting frame-work adapted to carry a series of removable shelves and meat supporting frame-work, a removable frame-work adapted to support meat hung therefrom, a removable shelf of skeleton structure formed with apertures curved in out-line in approximation to the out-line of the meat pieces; with a cloth sheeting stretched over the skeleton shelves and depressed into the curved shaped apertures.

3. In a smoking trolley, a frame-work shelf having apertures curved in out-line and with a cloth sheeting stretched over the frame-work shelf and depressed into the curved apertures.

4. In a smoking trolley, means for hanging meat by suspension in combination with supporting means beneath the meat, the latter being composed of a skeleton frame-work provided with curved apertures in out-line approximating the shapes of the meat pieces and with a cloth stretched over said frame-work and depressed into the curved apertures.

5. In a smoking trolley, a series of shelves composed of skeleton frame-works covered with a cloth sheeting, said skeleton frame-works provided with a plurality of rows of rings forming apertures and said cloth sheeting covering the entire series of rows of ring formed apertures for any given shelf.

6. In a meat smoking trolley, a placing device, for hams, composed of a hook adapted to support the ham from underneath the butt and be hung from the hanging bar to which the shanks of the hams are hung and to hold the ham in position for the proper registration of the hanging chains while the latter are being engaged to the hanging bars.

7. In a smoking trolley adapted to support hams by suspension from their shanks and also from beneath their butts, a placing device adapted to assist and place the hams in positions for hanging wherein their butts fall approximately in the same plane on any given shelf, said placing device composed of a form or hook adapted to support the ham from the butt and hold it in a position of registry with the hanging device.

8. In a smoking trolley adapted to support hams underneath the butts thereof in hammocks or pockets approximating the shape of the ham butts, a forming block adapted to form the cloth sheeting used for the supporting shelf into pockets or hammocks suited to receive the ham butts, and said forming block composed of an oval shaped block approximating the shape of a ham butt.

9. In a smoking trolley adapted to support hams by suspension from their shanks and also support them from beneath their butts by means of a cloth fabric shelf formed in the shape of hammocks or pockets adapted to receive the ham butts, a shaping means for the cloth of the shelves adapted to shape the cloth into depressions for holding the ham butts, and said shaping means composed of oval shaped blocks approximating the shape of a section of a ham butt.

Signed in Chicago, in the State of Illinois, and county of Cook this 28th day of March 1917.

ALONZO NEWTON BENN.

Witnesses:
MABEL E. NAFE,
THEO. M. WILLIAMS.

Copies of this patent may be obtained for five cents each, by addressing the "Commissioner of Patents, Washington, D. C."